United States Patent [19]

Oshita et al.

[11] Patent Number: 4,979,114

[45] Date of Patent: Dec. 18, 1990

[54] MOTOR CONTROL APPARATUS FOR ELECTRIC POWER STEERING SYSTEM

[75] Inventors: Saiichiro Oshita; Toyohiko Mouri; Tsutomu Takahashi, all of Tokyo, Japan

[73] Assignee: Fuji Jukogyo Kabushiki Kaisha, Tokyo, Japan

[21] Appl. No.: 341,043

[22] Filed: Apr. 20, 1989

[30] Foreign Application Priority Data

| Apr. 21, 1988 | [JP] | Japan | 63-99859 |
| May 20, 1988 | [JP] | Japan | 63-124072 |
| May 20, 1988 | [JP] | Japan | 63-124073 |

[51] Int. Cl.$^5$ ............................................. B62D 5/04
[52] U.S. Cl. .............................. 364/424.05; 180/79.1; 180/142
[58] Field of Search ................. 364/424.05; 180/79.1, 180/141, 142, 143

[56] References Cited

U.S. PATENT DOCUMENTS

| 4,730,686 | 3/1988 | Shimizu | 180/79.1 |
| 4,800,975 | 1/1989 | Oshita et al. | 180/79.1 |
| 4,842,088 | 6/1989 | Oshita et al. | 180/79.1 |
| 4,875,540 | 10/1989 | Oshita et al. | 180/79.1 |

Primary Examiner—Gary Chin
Attorney, Agent, or Firm—Beveridge, DeGrandi & Weilacher

[57] ABSTRACT

A motor control apparatus for an electric power steering system of a vehicle is provided. The apparatus includes a torsion torque sensor for detecting a torsion torque of the steering system, a vehicle speed sensor, a steering angle sensor, a control unit for controlling the rotational direction and torque of an electric motor in accordance with a command signal derived from the outputs from the torque sensor, vehicle speed sensor and steering angle sensor, and a neutral position recovery command unit for generating a recovery signal in response to which the steering system is returned to a neutral position, in accordance with an output signal from the steering angle sensor and when the absolute values of the output signals from the torsion torque sensor and vehicle speed sensor becomes smaller than or equal to predetermined values. The neutral position recovery command unit operates such that the recovery signal functions to make a recovery steering angle speed gradually decreases toward 0 as the steering system is returned to the neutral position while following a predetermined target steering speed. The neutral position recovery command unit also operates such that the recovery signal functions to gradually move the recovery target value toward 0.

12 Claims, 13 Drawing Sheets

MOTOR CONTROL APPARATUS FOR ELECTRIC POWER STEERING SYSTEM

BACKGROUND OF THE INVENTION

The present invention relates to a motor control apparatus for an electric power steering system by which apparatus a motor-driven auxiliary steering power (power assist) is given to a steering system of a vehicle.

The motor control apparatus for the electric power steering system of this type has already been proposed by the present applicant (refer to Japanese Patent Laid-open Publication JP-A-61-98675). This motor control apparatus is provided with a torsion torque sensor for detecting a torsion torque of the steering system and a steering angle sensor for detecting a steering angle. A command signal obtained from the torsion torque sensor becomes small as a vehicle speed obtained from a vehicle speed sensor increases. The command signal is added to a return signal which becomes large as the steering angle obtained from the steering angle sensor increases. The added signal is used in controlling a rotational direction and assist torque of the electric motor of the power steering system.

According to the conventional motor control apparatus for the electric power steering system described above, automatic recovery of the steering system to a neutral position is carried out only during vehicle running state, and not during stopping or parking. During the latter state, only steering force becomes light. Therefore, there may occur a dangerous case where a driver starts operating the vehicle without knowing which direction the wheels have been steered, so that the driver has to immediately turn the steering wheel in an opposite direction. Thus, the conventional motor control apparatus still leaves a problem of poor operability.

SUMMARY OF THE INVENTION

An object of the present invention is to provide a motor control apparatus for an electric power steering system capable of automatically returning to a neutral steering position during a stop or parking state and also to provide protecting the electric motor from overload during such operation.

According to a first aspect of the present invention, in an electric power steering system having a torsion torque sensor for detecting a torsion torque of a steering system; a vehicle speed sensor for detecting a vehicle speed; and a steering angle sensor for detecting a steering angle; wherein a rotational direction and torque of an electric motor are controlled in accordance with a command signal derived from the torque sensor, the vehicle speed sensor and the steering angle sensor; a motor control apparatus for the electric power steering system is characterized in that a neutral position recovery command unit generates a recovery signal to return to a neutral position, in accordance with the steering angle and when absolute values of the torsion torque sensor and the vehicle speed become smaller than or equal to each predetermined value.

The neutral position recovery command unit generates the recovery signal only for a predetermined time duration.

Upon stopping/parking a vehicle, the absolute values of the torsion torque and the vehicle speed become smaller than or equal to each predetermined value, and the recovery signal is outputted to return to the neutral position from the neutral position recovery command unit in accordance with the steering angle.

According to the first aspect of the present invention described above, upon stopping/parking a vehicle, the recovery signal is outputted to return to the neutral position from the neutral position recovery command unit so that the steering system is automatically returned to the neutral position by the electric motor. Therefore, steering at restarting the vehicle becomes safe and reliable.

Since the recovery signal stops after a lapse of a predetermined time, even if the electric motor is subjected to overload because of disability of steering the vehicle tire contacting an obstacle, the overload is released after the lapse of the predetermined time, thus protecting the electric motor.

According to a second aspect of the present invention, in the electric power steering system described above, wherein the recovery signal gradually decreases toward 0 as the steering system is returned to the neutral position with a recovery speed of the steering angle following a target steering angle speed.

The neutral position recovery command unit generates the recovery signal only for a predetermined time duration.

Upon stopping/parking a vehicle, the absolute values of the torsion torque and the vehicle speed become smaller than or equal to each predetermined value, and the recovery signal is outputted to return to the neutral position from the neutral position recovery command unit, and to decrease a recovery steering angle speed gradually toward 0 as the steering system is returned to the neutral position. The recovery signal stops after the lapse of the predetermined time.

According to the second aspect of the present invention described above, the recovery steering angle speed gradually decreases toward 0 as the steering system is returned to the neutral position, thus ensuring good operation feeling and safety.

According to a third aspect of the present invention, in the electric power steering system described above, wherein a recovery target value of the steering angle moves gradually to 0.

The neutral position recovery command unit generates the recovery target value only for a predetermined time duration.

Upon stopping/parking a vehicle, the absolute values of the torsion torque and the vehicle speed become smaller than or equal to each predetermined value, and the recovery signal is outputted to return to the neutral position from the neutral position recovery command unit in accordance with the steering angle, the recovery signal gradually returns to the neutral position while following the recovery target value. The recovery signal stops after the lapse of the predetermined time.

According to the third aspect of the present invention described above, the steering system is gradually returned to the neutral position while following the recovery target value, thus ensuring good steering feeling and safety.

The other objects and features of this invention will become understood from the following description with reference to the accompanying drawings.

DETAILED DESCRIPTION OF THE PREFERRED EMBODIMENTS

The embodiments of the present invention will be described in detail with reference to the accompanying drawings.

Figure 1:
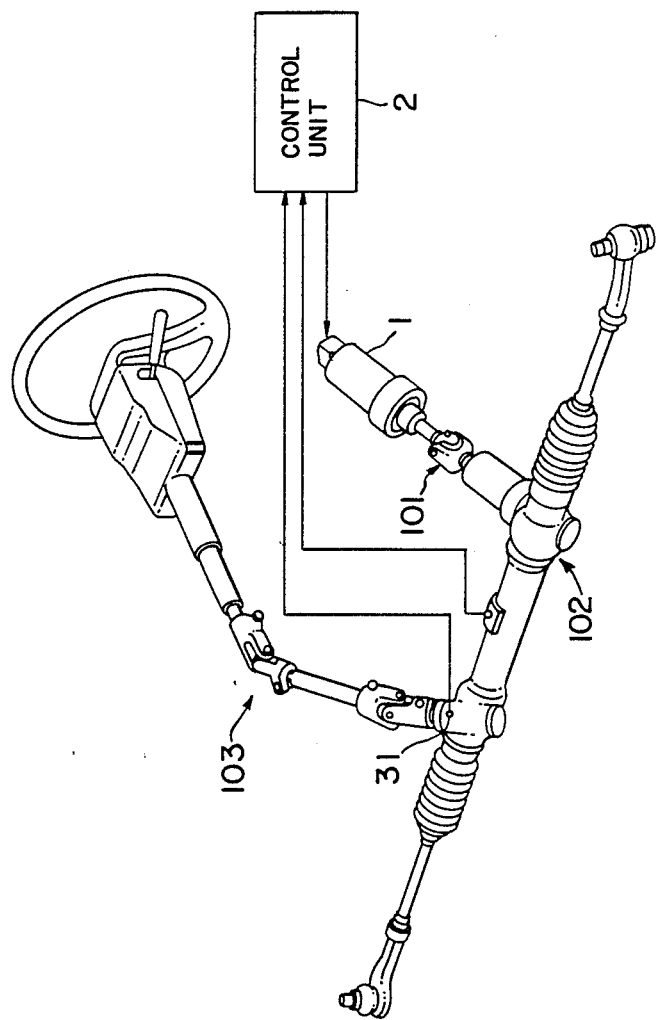
FIG. 1 is a schematic illustration of an electric power steering system according to the present invention.
Figure 2:
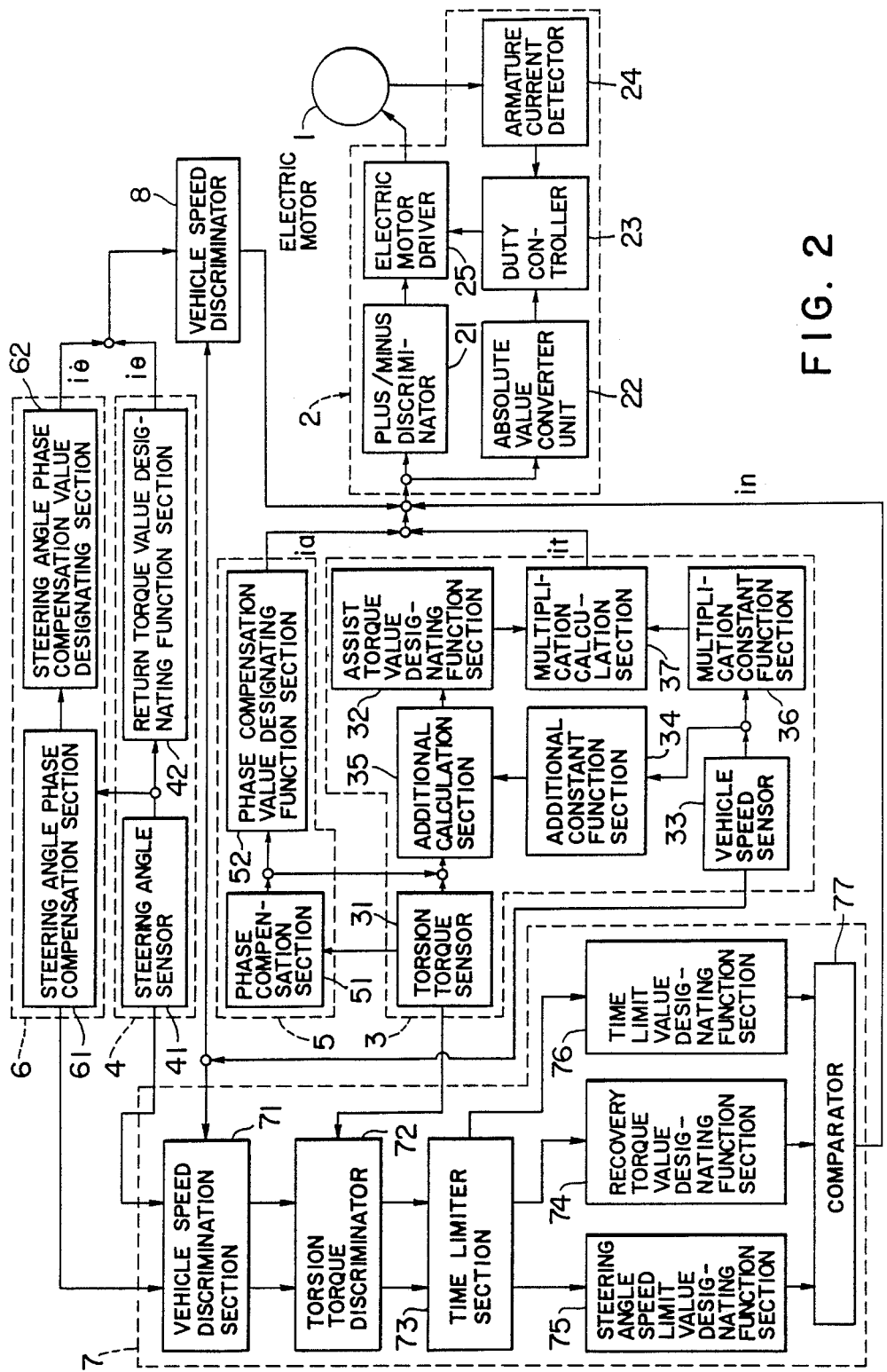
FIG. 2 is a block diagram showing an embodiment of a motor control apparatus of the electric power steering system.

Referring to FIG. 1, a power assist electric motor 1 is coupled via a joint 101 to a rack/pinion mechanism 102 of the steering system 103 for supplying an assist power thereto. A rotational direction and torque of the electric motor 1 are controlled by a control unit 2 in accordance with a command signal supplied thereto. The control unit 2 comprises a plus/minus discriminator 21, absolute value converter unit 22, duty controller 23, armature current detector 24 and electric motor driver 25 as shown in FIG. 2. The command signal is inputted to the plus/minus discriminator 21 and absolute value converter 22. A discrimination signal from the plus/minus discriminator 21 is inputted to the electric motor driver 25 so that a direction of motor current is changed in accordance with the command signal. An output signal from the absolute value converter 22 is supplied to the duty controller 23 to determine the duty ratio which is supplied to the electric motor driver 25 to set the rotation torque in accordance with an amplitude of the command signal. Rotational torque of the electric motor 1 is controlled so as to have a predetermined constant value such that the armature current detector 24 detects an armature current of the electric motor 1 and feeds a detected value back to the duty controller 23.

The command signal supplied to the control unit 2 is generated by an assist command unit 3, return command unit 4, phase compensation command unit 5, steering angle phase compensation command unit 6 and neutral position recovery command unit 7.

Figure 3:
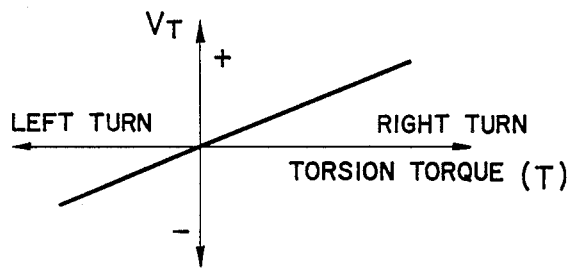
FIG. 3 is a graph showing the characteristic of a torsion torque sensor.

The assist command unit 3 generates an assist signal in accordance with magnitude and direction of a torsion torque of the steering system 103. The assist command unit 3 is provided with a torsion torque sensor 31 and an assist torque value designating function section 32. The torsion torque sensor 31 is mounted on the rack/pinion mechanism 102 of the steering system 103 to detect the magnitude and direction of the torsion torque. The assist torque value designating function section 32 outputs the assist signal based on an output voltage signal (refer to FIG. 3) from the torsion torque sensor 31. The assist signal has a fundamental characteristic as shown by a solid line in the graph of FIG. 4. Namely, the assist signal is not outputted when the magnitude of the torsion torque is smaller than or equal to a predetermined value, but outputted when it exceeds the predetermined value while increasing or decreasing an amplitude thereof in accordance with polarity and magnitude of the torsion torque.

Figure 4:
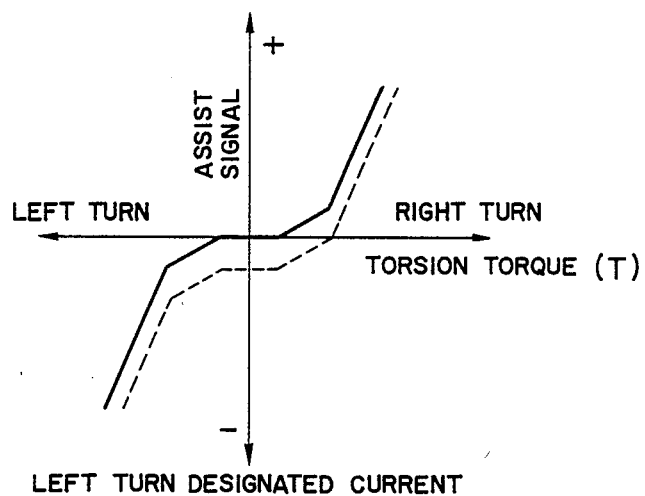
FIG. 4 is a graph showing the fundamental characteristic of an assist signal.
Figure 5:
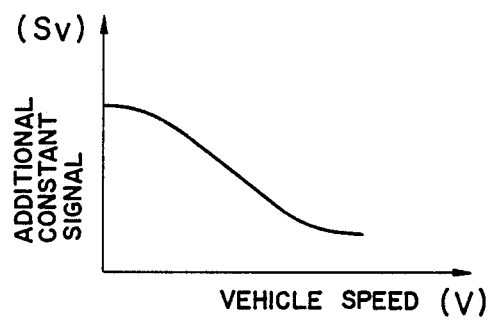
FIG. 5 is a graph showing a characteristic of an additional constant signal.

The assist command unit 3 is further provided with a vehicle speed sensor 33 for detecting speed of a vehicle, additional constant function section 34, and additional calculation section 35. The additional constant function section 34 generates an additional constant signal Sv in accordance with an output voltage signal from the vehicle speed sensor 33, and the additional constant signal Sv has the characteristic of decreasing its amplitude as the vehicle speed increases as shown in the graph of FIG. 5. The additional operation section 35 receives the additional constant signal Sv and an output signal from the torsion torque sensor 31 and outputs the sum thereof to the assist torque value designating function section 32. The additional operation section 35 performs an operation of adding/subtracting the additional constant signal Sv to/from the output signal of the torsion torque sensor 31 in accordance with the polarity of the output signal. As shown in the graph of FIG. 4, the assist signal is controlled to move change in an X axis direction as a vehicle speed parameter changes. An output from the assist torque value designating function section 32, as shown by the solid line in FIG. 6, decreases its absolute value as the vehicle speed increases under the same torsion torque value, and increases its absolute value as the absolute value of the torsion torque increases under the same vehicle speed. In order to change the output characteristic to the broken line in FIG. 6 in accordance with the vehicle speed, there are provided a multiplication constant function section 36 and multiplication calculation section 37. The multiplication constant function section 36 outputs a multiplication constant signal having a characteristic shown in FIG. 7 in accordance with the output voltage signal from the vehicle speed sensor 33. The multiplication constant signal takes a value 1 when the vehicle speed is 0, and a value decreasing toward 0 as the vehicle speed increases. The multiplication calculation section 37 multiplies the output from the assist torque value designating function section 32 by a multiplication constant. The assist signal it from the multiplication calculation section 37 has a value which changes in accordance with the vehicle speed as shown by a broken line in FIG. 6.

The assist signal is generated by using a memory map in which the assist signal it is a function of the torque signals and vehicle speed signals.

Figure 8:
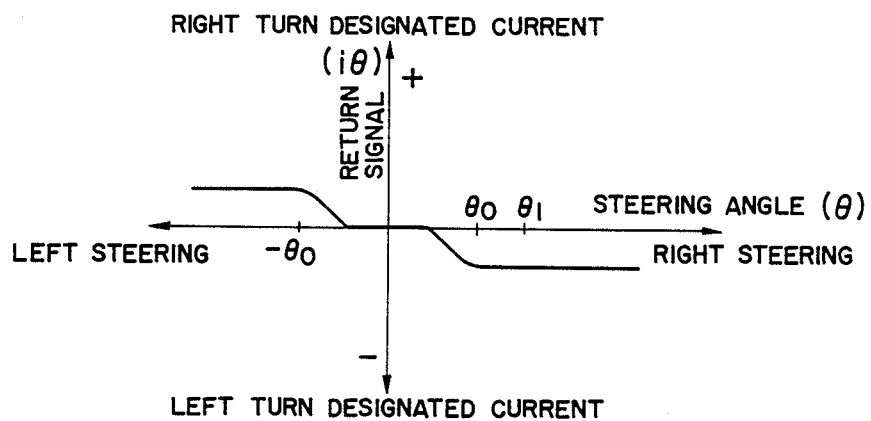
FIG. 8 is a graph showing a characteristic of a return signal.

The return command unit 4 generates a return signal for returning a steering angle to the neutral (straight forward) position in accordance with the steering angle. The return command unit 4 is provided with a steering angle sensor 41 for detecting the steering angle based on a movement of the rack/pinion mechanism 102 of the steering system 103, and a return torque value designating function section 42 for outputting a return signal $i\theta$ having a characteristic shown in the graph of FIG. 8 in accordance with a steering angle output voltage signal from the steering angle sensor 41.

The phase compensation command unit 5 is provided with a phase compensation section 51 and a phase compensation value designating function section 52. The phase compensation section 51 receives an output signal from the torsion torque sensor 31 and outputs a signal proportional to a differentiated value of the signal. The phase compensation value designating section 52 outputs a supplementary assist signal ia having the characteristic in dependency on the output signal from the phase compensation section 51 shown in the graph of FIG. 9. In this embodiment, the output signal from the phase compensation section 51 is added to the output signal from the torsion torque sensor 31 to change an input signal for the assist torque value designating function section 32.

The steering angle phase compensation command unit 6 generates an attenuation signal torward the direction opposite to the steering direction in accordance with the steering speed. The steering angle phase compensation command unit 6 is provided with a steering angle phase compensation section 61 and a steering angle phase compensation value designating section 62. The steering angle phase compensation section 61 receives the steering angle output voltage signal from the steering angle sensor 41 and generates a phase signal proportional to the differentiated value of the steering angle output voltage signal. The steering angle phase compensation value designating section 62 outputs an attenuation signal $i\theta$ having the characteristic in dependency on the output signal from the steering angle phase compensation section 61 shown in the graph of FIG. 10.

The neutral position recovery command unit 7 generates a recovery signal in to automatically recover to the neutral position during a stop or parking state of the vehicle. The neutral position recovery command unit 7 is provided with a vehicle speed discrimination section 71, torsion torque discriminator 72, time limiter section 73, recovery torque value designating function section 74, steering angle speed limit value designating function section 75, time limit value designating function section 76 and comparator 77. The steering angle output voltage signals from the steering angle sensor 41 and steering angle phase compensation section 61 are supplied via the vehicle speed discrimination section 71, torsion torque discriminator 72 and time limiter 73 to the recovery torque value designating function section 74 and steering angle speed limit value designating function section 75. The time limit value designating function section 76 receives a signal from the time limiter 73. The comparator 77 receives the signals from the designating function sections 74, 75 and 76.

The vehicle speed discrimination section 71 outputs voltage signals responsive to the steering angle output voltage signal and the phase signal from the steering angle phase compensation section 61 only when the vehicle speed becomes substantially 0 which is indicated by the output voltage signal from the vehicle speed sensor 33, and restricts outputting the output voltage signals except the vehicle speed of substantially 0. The torsion torque discriminator 72 outputs a torque signal receiving the voltage signal from the vehicle speed discriminator 71 only when the torsion torque becomes substantially 0 (e.g., smaller than or equal to 0.3 Kgf at the end portion of a steering wheel) which is indicated by the output signals from the torsion torque sensor 31, and restricts outputting the signals except the time of the case above which the torsion torque is substantially 0. The time limiter 73 outputs signals from the torsion torque discriminator 72, e.g., for 5 seconds after the time when the signals are supplied therefrom. A lapsed time signal is outputted to the time limit value designating function section 76.

Figure 11A:
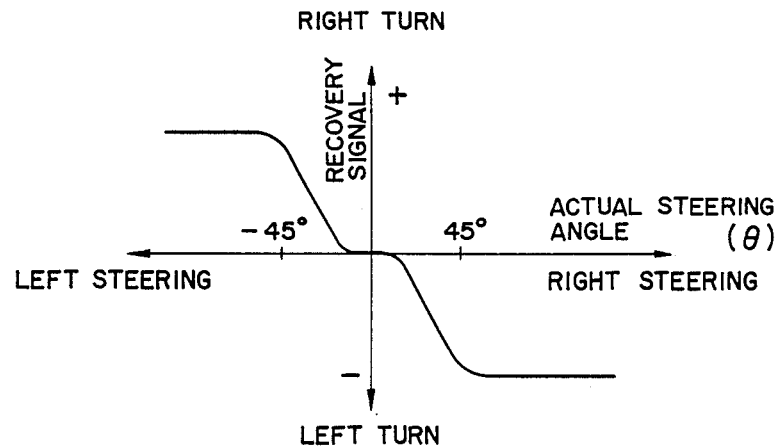
FIG. 11(a) is a graph showing a fundamental characteristic of a recovery signal.
Figure 11B:
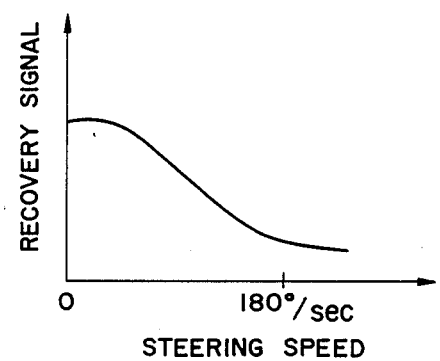
FIGS. 11(b) and 11(c) are graphs showing characteristics of recovery signals in functions of steering angle speed and time.
Figure 11C:
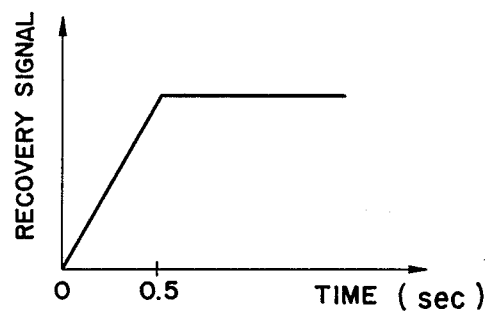

The recovery torque value designating function section 74 outputs a torque recovery signal having the characteristic shown in the graph of FIG. 11(a). Particularly, it outputs the torque recovery signal which represents a positive value (left turn) in the right turn steering region, and a negative value (right turn) in the left turn steering region excepts the region near the neutral position of 0 steering angle, and represents an absolute value which gradually increases within the range of plus/minus 45 degrees and becomes substantially a constant value over the range. The steering angle limit value designating function section 75 outputs a steering speed limit signal which has the same code as that of the recovery signal, and represents the absolute value which gradually decreases before the steering speed reaches about 180 degrees/sec as shown in the graph of FIG. 11(b). The time limit value designating function section 76 outputs a time limit signal which gradually increases before the lapsed time signal reaches 0.5 sec and thereafter becomes a constant value. The comparator 77 compares the torque recovery signal and the limit signals, and outputs the signal having the smallest absolute value as the recovery signal in.

In this embodiment, there is also provided a vehicle speed discriminator 8 to output sum of the return signal $i\theta$ from the return command unit 4 and the attenuation signal $i\theta$ from the steering angle phase compensation command unit 6. The vehicle speed discriminator 8 receives the sum of the return signal $i\theta$ and attenuation signal $i\theta$ and outputs the sum when the vehicle speed becomes higher than or equal to a predetermined speed, e.g., 5 Km/h from the vehicle sensor 33, and restricts outputting the sum when the vehicle speed becomes lower than 5 Km/h.

Under such restriction by the vehicle speed discriminator 8, outputted to the control unit 2 are sum of the assist signal it from the assist command unit 3 and the supplementary assist signal ia from the phase compensation command unit 5, and the recovery signal in from the neutral position recovery command unit 7.

Explaining operation of the motor control apparatus described above, upon generation of torsion torque at the steering system in the beginning of steering operation, the torsion torque sensor 31 detects torsion torque applied to the steering system 103 and delivers a corresponding signal. In this case, the assist signal it based on the torsion torque is adjusted in accordance with information from the vehicle speed sensor 33 and steering angle sensor 41. The assist signal it is discriminated whether it is plus or minus and via duty ratio control based on the absolute value of it delivered to control the rotational direction and assist torque of the electric motor 1. The relationship between the torsion torque and assist signal it is basically as shown in the graph of FIG. 4. For example, a positive assist signal is outputted for the right turn while increasing its amplitude as the torsion torque increases. Therefore, the electric motor 1 is driven to rotate in the direction assisting the right turn with the assist torque corresponding to the torsion torque being given, resulting in a reduction of steering force for turning to the right. For the left turn, a negative assist signal is supplied to rotate the electric motor in the direction assisting the left turn, in a similar manner to the right turn.

Figure 6:
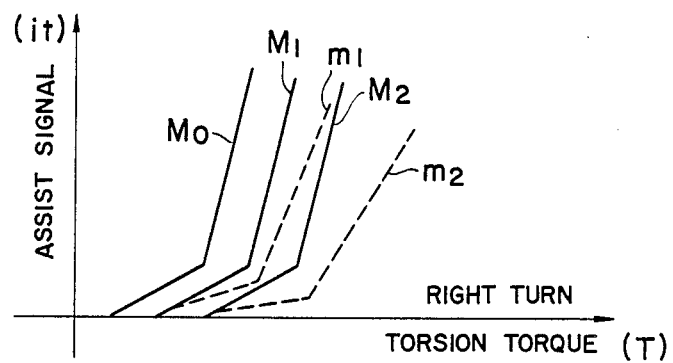
FIG. 6 is a graph showing changes of the characteristic of the assist signal.
Figure 7:
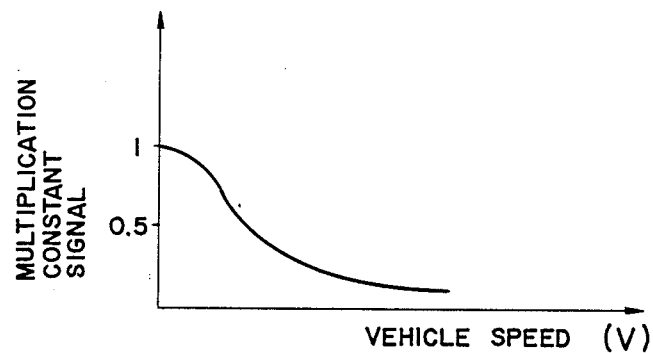
FIG. 7 is a graph showing a characteristic of a multiplication constant signal.

The functional characteristic between the torsion torque and assist signal changes in this embodiment in accordance with the output voltage signal from the vehicle sensor 33. For example, referring to the graph of FIG. 6 showing the characteristic of the assist signal relative to the right turn torsion torque, as the vehicle speed increases from 0 indicated by M0 assist signal to V1 and V2 indicated by M1 and M2 assist signals, respectively, the assist signals M1 and M2 are moved in parallel with M0 in the X-axis direction of FIG. 6 through adding the additional constant signal Sv from the additional constant function section 34. The assist signal M1 and M2 are changed to assist signals m1 and m2 having a smaller inclination through the multiplication operation by the multiplication constant signal. Thus, the amplitude of the assist signal decreases as the vehicle speed increases under the condition of the same torsion torque. This means that the output torque of the electric motor 1 decreases as the vehicle speed increases under the condition of the same torsion torque. Therefore, while retaining a sufficient power assist during low speed running of the vehicle, the steering force does not become excessive during high speed running of the vehicle, thus eliminating uneasiness caused by too light operation of the steering wheel.

In the meantime, the steering angle sensor 41 detects the steering angle upon steering operation. In accordance with the detected steering angle, the return signal $i\theta$ is outputted in the manner of characteristic shown in FIG. 8. Namely, the return signal $i\theta$ is not outputted near the neutral position of steering angle 0, but outputted signals which increases proportionally within the range between a predetermined right and left steering angles $\pm\theta_0$, and becomes a constant value outside the range between $\pm\theta_0$, i.e., a negative value (left turn direction) within the right turn range and a positive value (right turn direction) within the left turn range.

Figure 10:
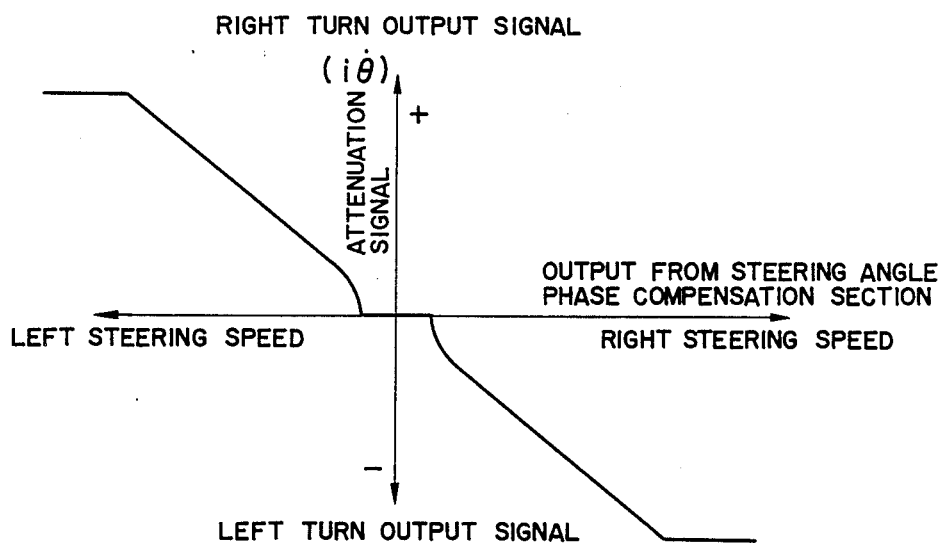
FIG. 10 is a graph showing a characteristic of an attention signal.

The steering phase compensation section 61 detects a rapid change of the steering angle $\theta$ caused by a rapid and sharp cornering at a small radius curve. In accordance with the detected signal, the attenuation signal $i\theta$ is outputted from the steering angle phase value designating section 62, and the characteristic of the attenuation signal $i\theta$ is shown in FIG. 10.

For running state higher than or equal to the vehicle speed of 5 Km/h, the return signal $i\theta$ and the attenuation signal $i\theta$ are added so as to decrease the assist signal it under the function of the vehicle speed discriminator 8, thereby eliminating uneasiness due to too light feeling during rapid steering. In addition, for example, during holding the steering wheel at the right turn steering angle $\theta_1$, the positive assist signal it obtained from the torsion torque sensor 31 is added to the negative return signal $i\theta_1$ obtained from the steering angle sensor 41 to control the electric motor 1 in accordance with the added signal. In FIG. 4, the assist signal it is indicated by a solid line, whereas the added signal is indicated by a broken line. Consequently, upon releasing the steering wheel from the right turn steering angle $\theta_1$, the torsion torque T decreases considerably so that the added signal immediately becomes the negative value (left turn direction) following the broken line shown in FIG. 4. As a result, torque in the left turn direction is generated on the electric motor 1 so that friction force at the reduction mechanism and the like and the moment of inertia of the motor are compensated to smoothly recover to the straight running, resulting in good recovery of the steering wheel. The amplitude of the return signal $i\theta$ decreases to 0 as the steering angle $\theta$ decreases so that when the steering angle returns to the neutral position the torque of the electric motor becomes null.

In the case where the steering wheel is returned to the neutral position after a rapid turn (high-G turn), the steering wheel may sometimes overshoots the neutral position because of moment of inertia of the electric motor. However, the attenuation signal $i\theta$ outputted from the steering angle phase compensation command unit 6 prevents an excessive return of the steering wheel because the attenuation signal functions to generate the output torque in opposite direction to the rotational direction of the steering wheel, thus improving the operation after releasing the steering wheel during high speed running or the like.

Next, the steering operation during stopping the vehicle, is described hereinafter. In this case, since ground or road resistance is large, the torsion torque becomes very large during the steering operation, and the output voltage signal from the torsion torque sensor 31 becomes very large correspondingly. This increase of the torsion torque is detected by the phase compensation section 51 of the phase compensation command unit 5 so that the large output signal is produced from the phase compensation section 51. Consequently, even during the state where the torsion torque T is small and the corresponding assist signal it is not generated yet, if such increase of the torsion torque is large, the assist signal it is outputted at once so that the electric motor 1 is immediately actuated without any response delay self-excited vibrations.

During the steering operation at the vehicle speed lower than 5 Km/h, the return signal $i\theta$ from the return command unit 4 and the attenuation signal $i\theta$ from the steering angle phase compensation command unit 6 are restricted by the vehicle speed discriminator 8. Therefore, there is no energy waste so that smooth steering can be realized.

Figure 9:
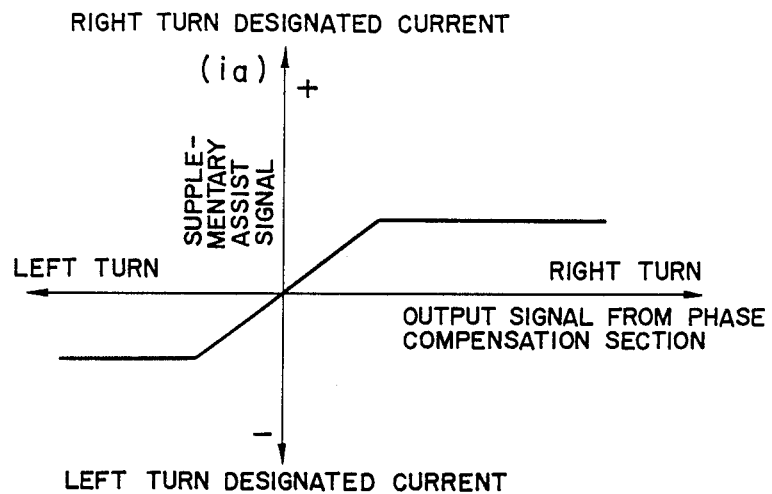
FIG. 9 is a graph showing a characteristic of a supplemental assist signal.

Responsive to the signal from the phase compensation section 51, the supplementary assist signal ia having the characteristic shown in FIG. 9 is immediately outputted from the phase compensation value designating function section 52 in accordance with the changing direction of the torsion torque. The supplementary assist signal ia increases or decreases proportionally within the predetermined range of the torsion torque, and becomes a constant value outside the predetermined range. Consequently, during repeating the steering operations of right and left turn, the supplementary assist signal ia is immediately outputted to absorb moment of inertia of the electric motor 1 in the beginning and the end of the operation.

Figure 12:
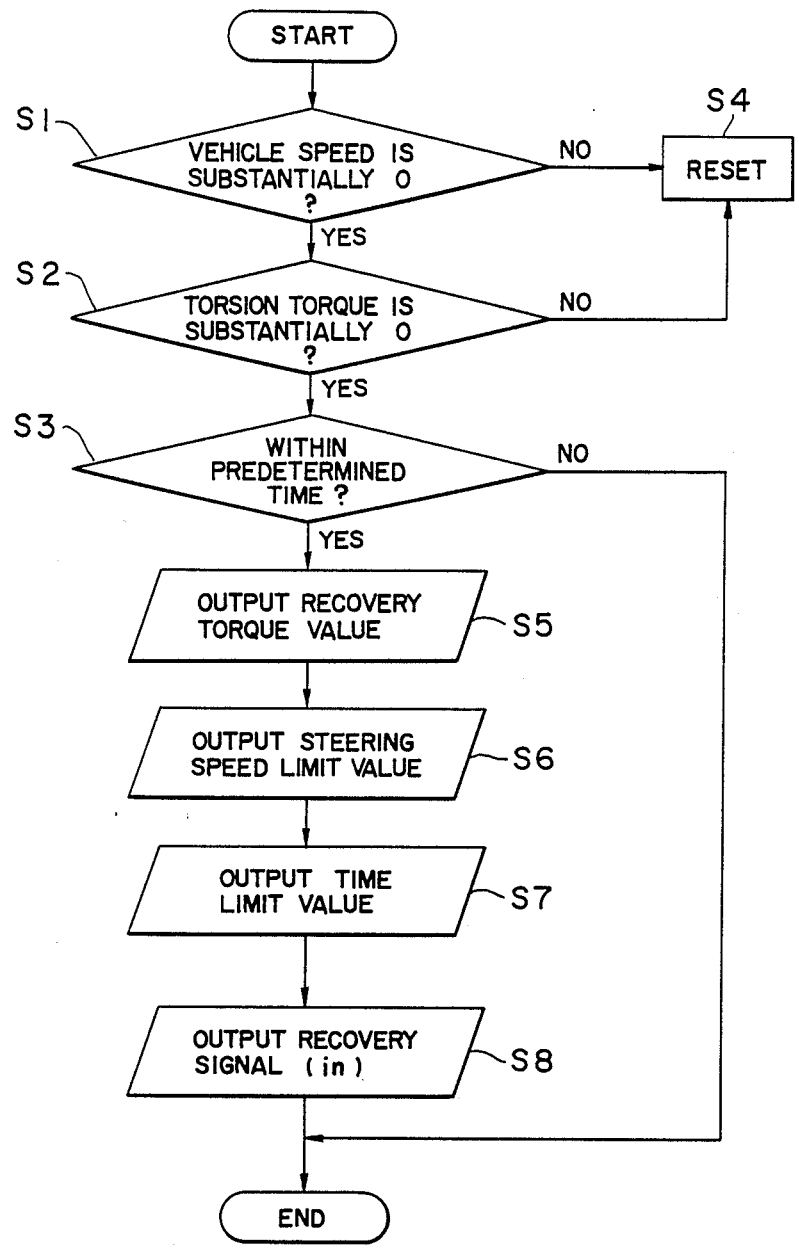
FIG. 12 is a flow chart showing an operation of a neutral position recovery command unit.

The operation of stopping and/or parking the vehicle will be described hereinafter with reference to the flow chart shown in FIG. 12. First, the vehicle speed discrimination section 71 checks if the vehicle speed is approximately 0 (this value is optionally determined according to detectionable ability of the vehicle sensor 33) (step S1). If YES, the torsion torque discriminator 72 checks if the torsion torque is approximately 0 (step S2). If YES, it is judged that the driver has no intention to perform the steering operation and the vehicle is not stopping or parking. Then, advance to next step S3. If NO at the steps S1 and S2, the neutral position recovery command unit 7 is reset (step S4).

At the step S3, the time limiter section 73 checks if the lapsed time is within a predetermined time (5 seconds). If NO, the operation is terminated. If YES, during the predetermined time, the recovery signal in and limit signals are outputted from the recovery torque, value designating function section 74, the steering angle speed limit value designating function section 75, and the time limit value designating function section 76 (steps S5, S6 and S7). These signals are compared at the comparator 77 and the signal having the smallest absolute value is outputted therefrom as the recovery signal in (step S8).

If the vehicle stops or parks under the condition of an intermediate steering state, the electric motor 1 is driven for the predetermined time (5 seconds) in response to the recovery signal in from the steering sensor 41 so that the steering wheel is automatically returned to the neutral position. In such a case, even when the steering angle is large and accordingly the absolute value of the recovery signal from the recovery torque value designating function section 74 is large, the time limit signal from the time limit value designating function section 76 of which absolute value gradually increases is outputted from the comparator 77, and upon increase of the steering angle speed, the time limit signal of which absolute value gradually decreases correspondingly is outputted from the comparator 77, so that the steering wheel is prevented from being turned abruptly, thus ensuring a safe operation.

Further, during automatically recovering to the neutral position at the stopping and/or parking state, even in the case where steering is impossible due to confronting some obstacle, the electric motor 1 is stopped to drive because of no output of the recovery signal after the lapse of the predetermined time, and thus avoiding a possible damage of the electric motor 1 to be caused by an overload.

Figure 13:
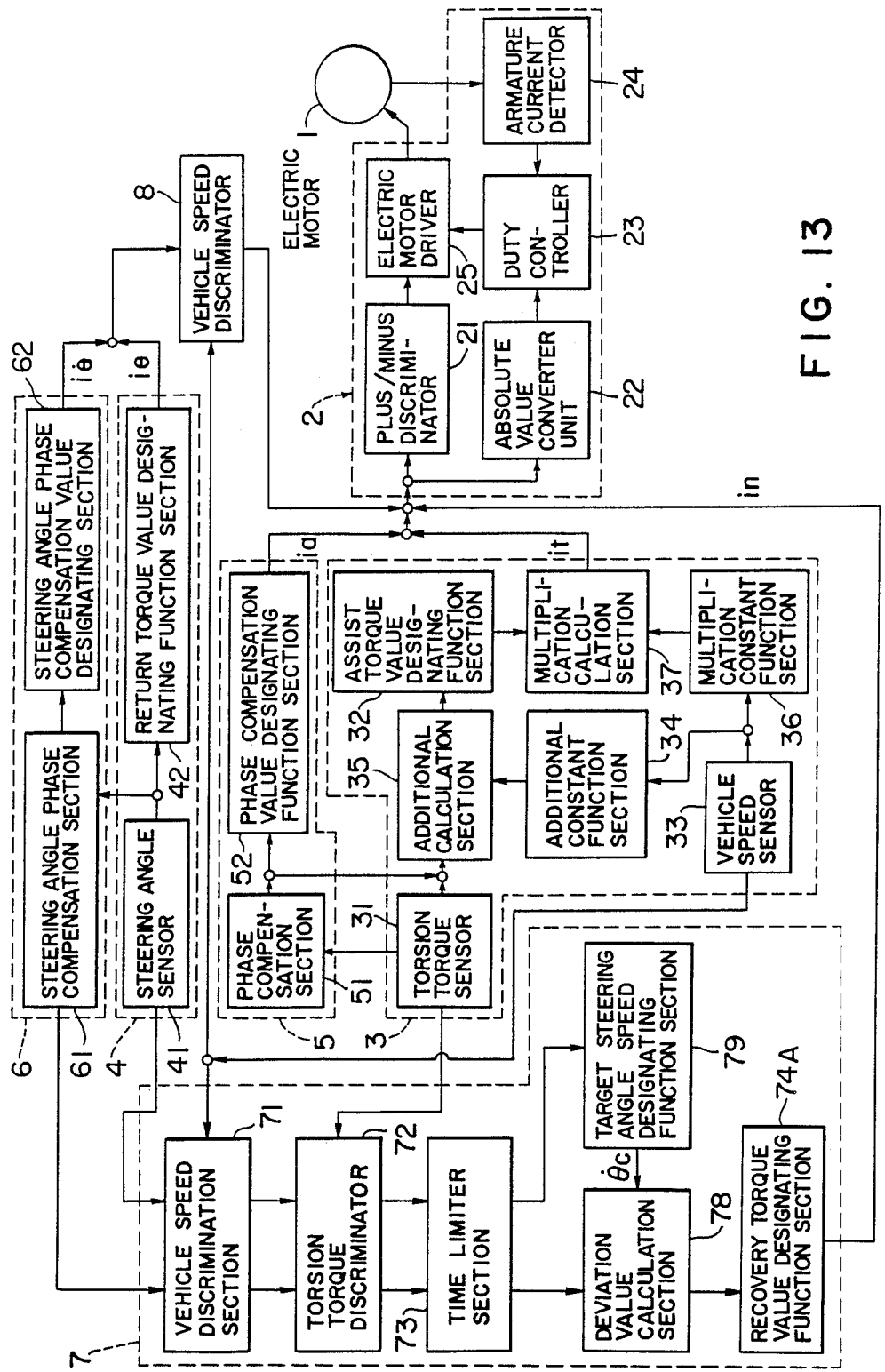
FIG. 13 is a block diagram showing another embodiment of the motor control apparatus according to the present invention.

FIG. 13 shows a second embodiment of this invention which differs from the first embodiment in the structure of the neutral position recovery command unit 7. In this embodiment, the neutral position recovery command unit 7 generates the recovery signal in in accordance with which the steering automatically recovers the neutral position during stopping or parking state of the vehicle. The neutral position recovery command unit 7 is provided with the vehicle speed discrimination section 71, the torsion torque discriminator 72, the time limiter section 73, a deviation value calculation section 78, a target steering angle speed designating function section 79, and a recovery torque value designating function section 74A. The output voltage signals from the steering angle sensor 41 and steering angle phase compensation, section 61 are supplied via the vehicle speed discrimination section 71, the torsion torque discriminator 72 and the time limiter 73 to the deviation value calculation unit 78 and the target steering angle speed designating function section 79. The recovery torque value designating function section 74A receives a signal from the deviation value calculation section 78.

The operation of the vehicle speed discrimination section 71 and the torsion torque discriminator 72 is the same as that of the first embodiment. The time limiter 73 responsive to the signals from the torsion torque discriminator 72 outputs a signal for 5 seconds after 0.2 second waiting time.

Figure 14:
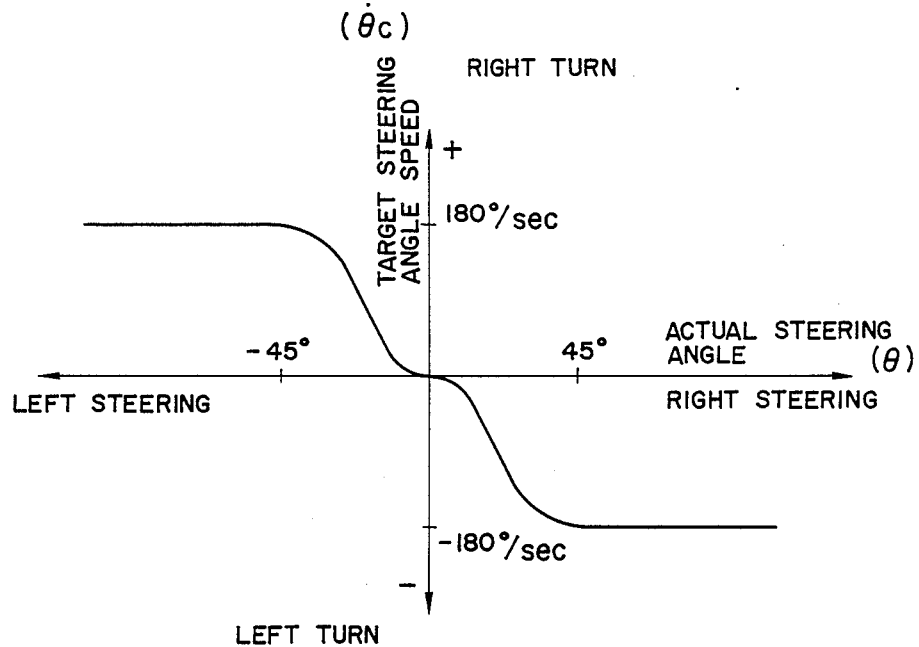
FIG. 14 shows a target steering angle speed in a function of the steering angle.

The target steering angle speed designating function section 79 outputs a target angle speed $\dot{\theta}_c$ having the characteristic shown in the graph of FIG. 14. Particularly, it outputs the target angle speed $\dot{\theta}_c$ which becomes a positive value (left turn) in the right turn steering range, and a negative value (right turn) in the left turn steering range except the range near the neutral position of 0 steering angle. And the target angle speed $\dot{\theta}_c$ gradually increases within the range of $\pm 45$ degrees and becomes substantially a constant value outside the $\pm 45$ degrees range. The deviation value calculation section 78 compares the recovery steering angle speed $\dot{\theta}$ obtained with the target steering angle speed $\dot{\theta}_c$ and outputs a deviation value $(\dot{\theta}_c - \dot{\theta})$ to the recovery torque value designating function section 74A. In this case the values $\dot{\theta}_c$ and $\dot{\theta}$ are a positive value for the right turn and a negative value for the left turn.

Figure 15:
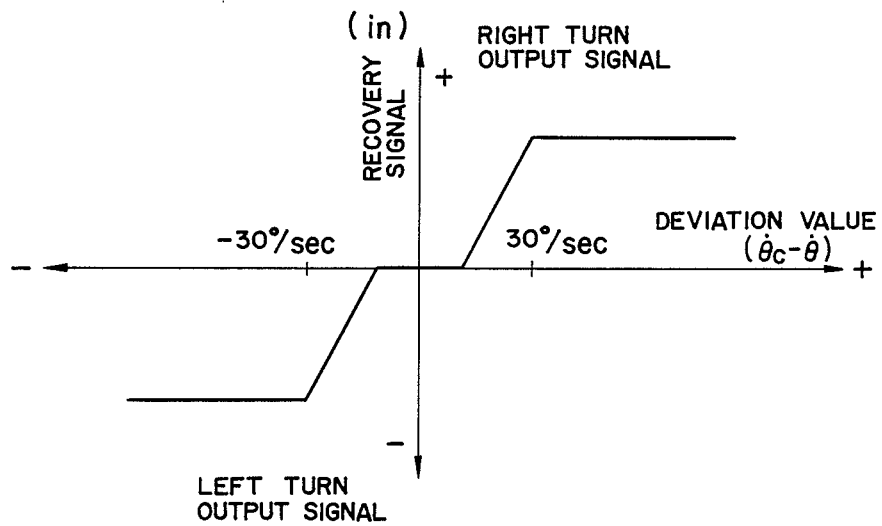
FIG. 15 is a graph showing a fundamental characteristic of a recovery signal in the embodiment shown in FIG. 13.

The recovery torque value designating function section 74A outputs the recovery signal in having the characteristic shown in the graph of FIG. 15 in accordance with the deviation value $(\dot{\theta}_c - \dot{\theta})$. The recovery signal becomes a positive value (right turn) for the positive deviation and a negative value (left turn) for the negative deviation except the range near 0 of the deviation value $(\dot{\theta}_c - \dot{\theta})$, and proportionally increases from zero within the predetermined range the deviation value $(\dot{\theta}_c - \dot{\theta})$ and becomes a constant value outside the range.

At the start of the recovery operation, the recovery steering angle speed $\dot{\theta}$ is substantially 0, so that $(\dot{\theta}_c - \dot{\theta})$ is large. Therefore, the recovery signal in becomes large at once so that a predetermined rising time of the recovery signal in or $\dot{\theta}_c$ is set time (e.g., 0.2 sec).

Figure 16:
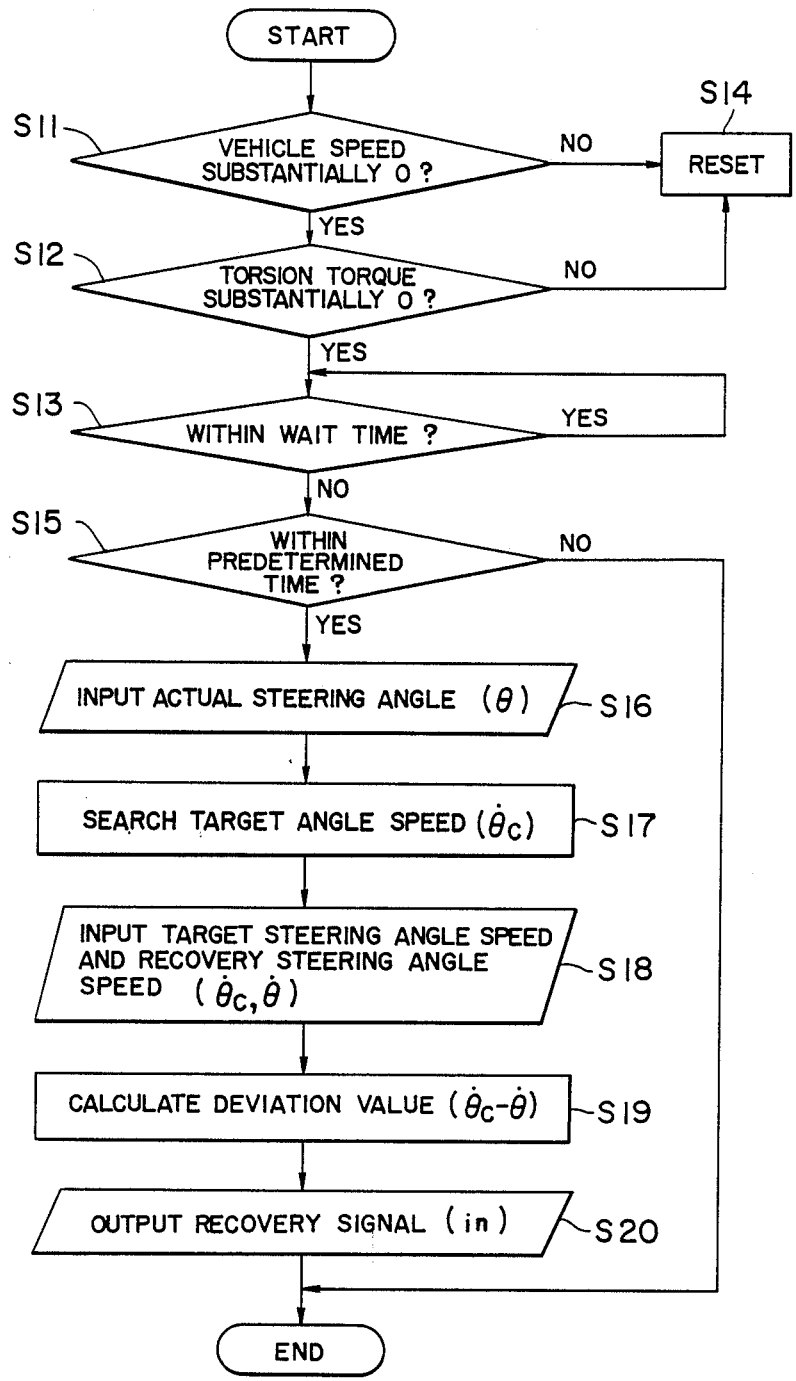
FIG. 16 is a flow chart showing an operation of the embodiment shown in FIG. 13.

The operation of stopping and/or parking the vehicle is described with reference to the flow chart shown in FIG. 16. First, the vehicle speed discrimination section 71 checks if the vehicle speed is approximately 0 (this value is optionally decided depending upon hysteresis of the vehicle sensor 33) (step S11). If YES, the torsion torque discriminator 72 checks if the torsion torque is approximately 0 (step S12). If YES, it is judged that the driver has no intention to perform the steering operation and the vehicle is not stopping or parking and then proceeds to next step S13. If NO, at the steps S11 and S12, the neutral position recovery command unit 7 is reset (step S14).

At the step S13, the time limiter section 73 checks if the lapsed time is within a wait time (0.2 sec). If NO, it is further checked at step S15 if the lapsed time is within the predetermined time (5 seconds). If NO, the operation is terminated. If YES, during the predetermined time, the following control is performed. Namely, an actual steering angle $\theta$ is inputted to the target steering angle speed designating function section 79 (step S16) to search the target steering angle speed $\dot{\theta}_c$ (step S17). Next, the target steering angle speed $\dot{\theta}_c$ and the recovery steering angle speed $\dot{\theta}$ are inputted to the deviation value calculation section 78 (step S18) to calculate the deviation value $(\dot{\theta}_c - \dot{\theta})$ (step S19). In accordance with the calculated deviation value, the recovery signal in is outputted from the recovery torque designating function section 74A (step S20).

If the vehicle stops or parks under the condition of an intermediate steering state, the electric motor 1 is driven after the wait time (0.2 second) for the predetermined time (5 seconds) in response to the recovery signal in so that the steering wheel is automatically returned to the neutral position. In such a case, even if the steering angle is large, the recovery steering angle speed $\dot{\theta}$ decreases gradually toward 0 while following the target steering angle speed $\dot{\theta}_c$ so that the steering wheel gradually rotates to automatically return to the neutral position, thus ensuring good steering feeling and safety. In addition, since the wait time is provided during the steering operation, the automatic recovery operation starts after the wait time, thus resulting a smooth switching to the recovery operation.

Further, during automatic recovery to the neutral position at the stopping and/or parking state, even in the case where steering is impossible due to engaging some obstacle, the electric motor 1 stops because of no output of the recovery signal after the lapse of the predetermined time, thus avoiding a possible damage of the electric motor 1 to be caused by the overload.

Figure 17:
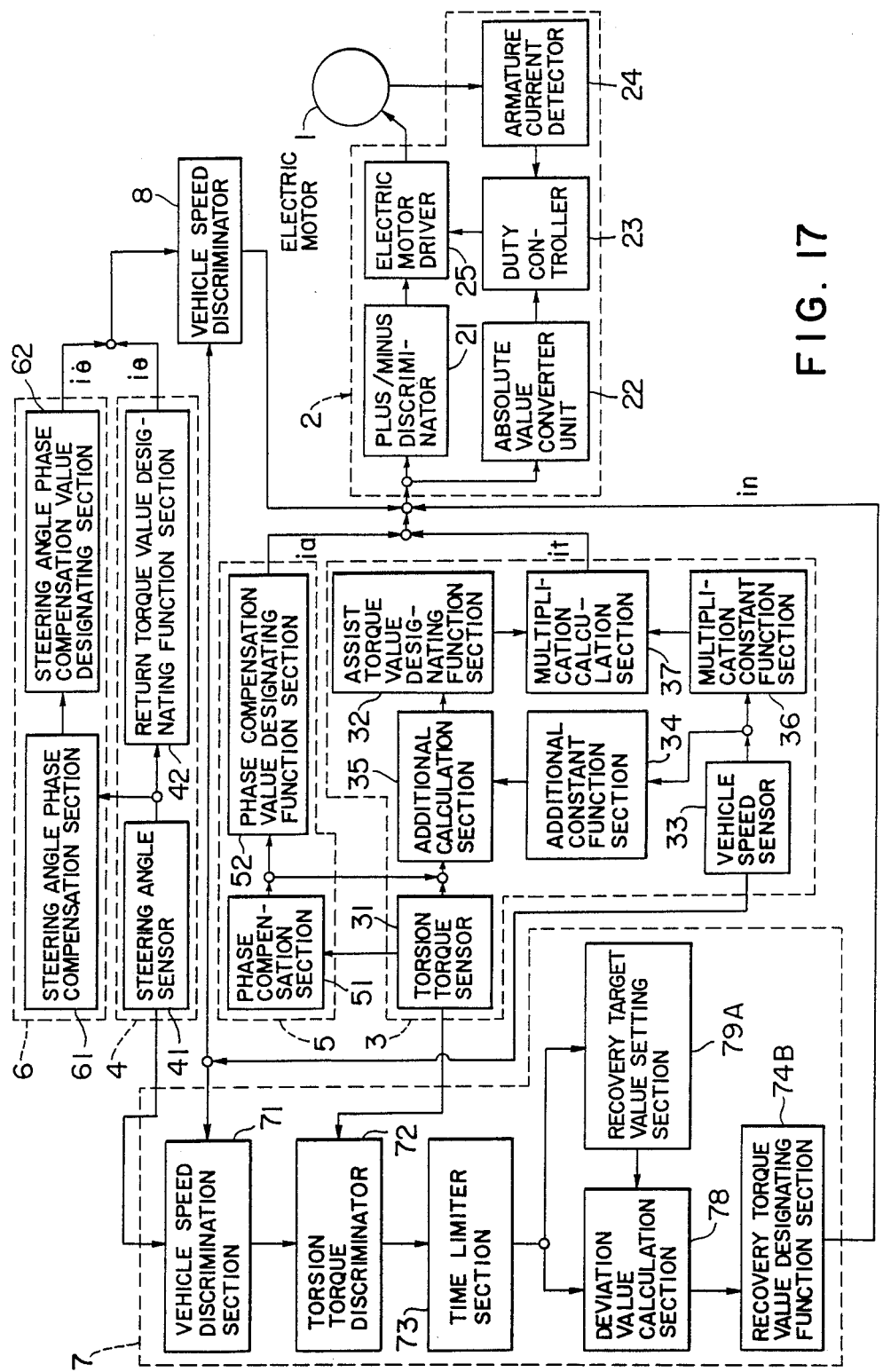
FIG. 17 is a block diagram showing another embodiment of the motor control apparatus according to the present invention.

FIG. 17 shows a third embodiment of this invention which differs from the first and second embodiments in the structure of the neutral position recovery command unit 7. In this embodiment, the neutral position recovery command unit 7 generates the recovery signal in in accordance with which the steering automatically recovers to the neutral position during stopping or parking the vehicle. The neutral position recovery command unit 7 is provided with the vehicle speed discrimination section 71, the torsion torque discriminator 72, the time limiter section 73, the deviation value calculation section 78, a recovery target value setting section 79A, and a recovery torque value designating function section 74B. The output voltage signal from the steering angle sensor 41 is supplied via the vehicle speed discrimination section 71, torsion torque discriminator 72 and time limiter 73 to the deviation value calculation section 78 and the recovery target value setting section 79A. The recovery torque value designating function section 74B receives a signal from the deviation value calculation section 78.

The operation of the vehicle speed discrimination section 71, the torsion torque discriminator 72 and the time limiter 73 is the same as described above.

Figure 18:
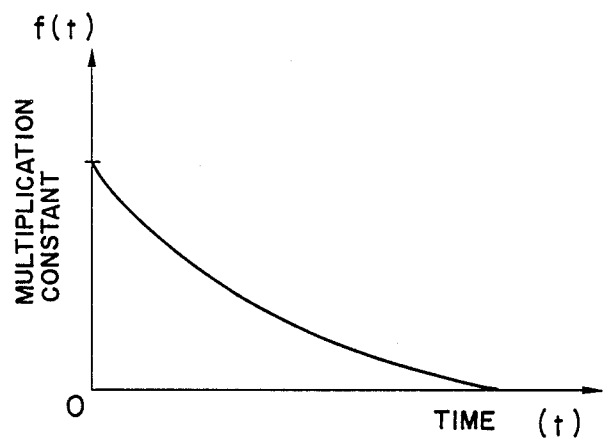
FIG. 18 is a graph showing a multiplication constant characteristic used for generating the recovery signal in the embodiment shown in FIG. 17.

The recovery target value setting section 79A stores an initial steering angle $\theta_0$ obtained from the time limiter section 73. The initial steering angle is multiplied by a predetermined multiplication constant f(t) which is a time function, and thus a recovery target value $\theta_c$ is set. The multiplication constant f(t) has the characteristic of gradually decreasing from 1 to 0 as time (t) lapses, as shown in FIG. 18. Therefore, the recovery target value $(\theta_c = \theta_0 \cdot f(t))$ gradually moves toward 0 as the time lapses (in this embodiment, the lapsed time is within 5 seconds in correspondence with the time limiter section 73). The deviation value calculation section 78 compares the actual steering angle $\theta$ with the target value $\theta_c$ and outputs a deviation value $(\theta_c - \theta)$ to the recovery torque value designating function section 74B. The values $\theta_c$ and $\theta$ becomes a positive value for the right turn and a negative value for the left turn.

Figure 19:
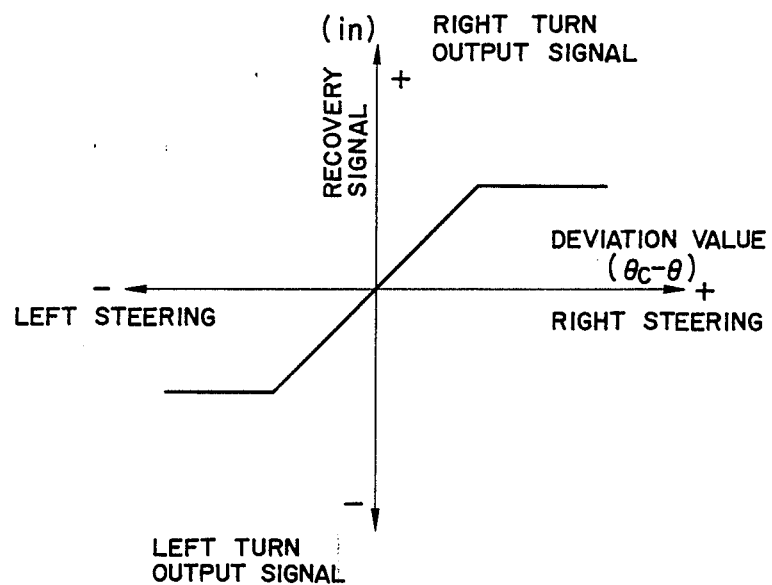
FIG. 19 is a graph showing a fundamental characteristic of the recovery signal in the embodiment shown in FIG. 17.

The recovery torque value designating function section 74B outputs the recovery signal in having the characteristic shown in the graph of FIG. 19 in accordance with the deviation value $(\theta_c - \theta)$. The recovery signal becomes the positive value (right turn) for the positive deviation and the negative value (left turn) for the negative deviation, except the range near 0 of the deviation value $(\theta_c - \theta)$, and proportionally increases within the predetermined range of the deviation value $(\theta_c - \theta)$ and becomes a constant value outside the range.

Figure 20:
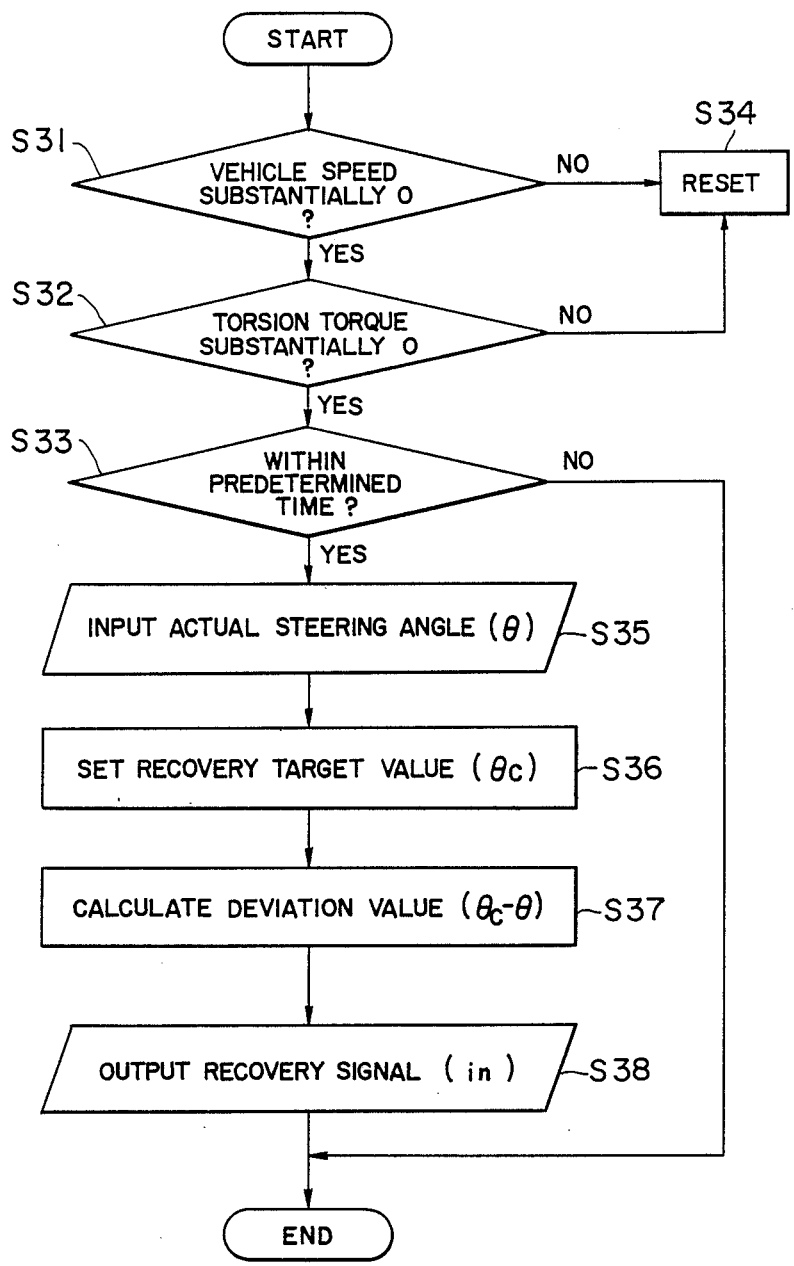
FIG. 20 is a flow chart showing an operation of the embodiment shown in FIG. 17.

The operation of stopping and/or parking the vehicle is described with reference to the flow chart shown in FIG. 20. First, the vehicle speed discrimination section 71 checks if the vehicle speed is approximately 0 (this value is optionally decided depending upon hysteresis of the vehicle sensor 33) (step S31). If YES, the torsion torque discriminator 72 checks if the torsion torque is approximately 0 (step S32). If YES, it is judged that the driver has no intention to steer and the vehicle is not stopping or parking, and thus proceeds to next step S33. If NO at the steps S31 and S32, the neutral position recovery command unit 7 is reset (step S34).

At the step S33, the time limiter section 73 checks if the lapsed time is within the predetermined time (5 seconds). If NO, the operation terminates. If the time lapses for the predetermined time, the neutral position recovery command unit 7 does not restart unless either the vehicle speed or torque becomes larger than or equal to the predetermined value. If YES, during the predetermined time, the operation is as follows. Namely, the actual steering, angle $\theta$ is inputted to the recovery target value setting section 79A and the deviation value calculation section 78 (step S36). The recovery target value setting section 79A sets the recovery target value $\theta_c$ (step S36). Then, the deviation value $(\theta_c - \theta)$ is calculated (step S37). In accordance with the calculated deviation value, the recovery signal in is outputted from the recovery torque designating function section 74B (step S38).

If the vehicle stops or parks under the condition of an intermediate steering state, the electric motor 1 is driven for the predetermined time (5 seconds) in response to the recovery signal in from the steering sensor 41 so that the steering is automatically returned to the neutral position. In such a case, even if the steering angle is large, the recovery target value $\theta_c$ is not 0 initially, but it gradually becomes 0. Also the actual steering angle $\theta$ follows the recovery target value, and the deviation value $(\theta_c - \theta)$ has a relatively small absolute value. Therefore, the recovery signal in also becomes the relatively small absolute value so that the steering wheel gradually rotates to automatically return to the neutral position, thus ensuring good steering feeling and safety.

Further, during automatic recovery to the neutral position at stopping and/or parking, even in the case where steering is impossible due to negotiating some obstacle, the electric motor 1 stops because of no output of the recovery signal after the lapse of the predetermined time, thus avoiding possible damage of the electric motor 1 to be caused by an overload.

According to the present invention, if the vehicle stops and/or parks on an inclined road, the automatic recovery to the neutral position described above is cancelled because of safety.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A motor control apparatus for an electric power steering system mounted on a vehicle, having wheels, a steering wheel operatively connected to said wheels, an electric motor for assisting the operation of said steering wheel, a torsion torque sensor for detecting a torsion torque of said steering system, a vehicle speed sensor for detecting a vehicle speed, a steering angle sensor for detecting a steering angle of said wheels, and means responsive to said torsion torque, said vehicle speed and said steering angle for controlling a rotational direction and torque of said electric motor so as to assist the operation of said steering wheel, comprising:

judging means responsive to said torsion torque and said vehicle speed for judging a stopping state of said vehicle; and generating means for generating a recovery signal to said electric motor to return said steering wheel to a neutral position when the stopping state is judged by said judging means.

2. The motor control apparatus according to claim 1, wherein said generating means generates said recovery signal only for a predetermined time duration.

3. The motor control apparatus according to claim 1, wherein said recovery signal gradually decreases toward 0 as the steering wheel comes nearer to said neutral position.

4. The motor control apparatus according to claim 1, wherein said judging means comprises:

a first circuit provided to compare said torsion torque with a first predetermined value; and a second circuit provided to compare said vehicle speed with a second predetermined value, so as to judge the stopping state of said vehicle when an absolute value of said torsion torque and said vehicle speed become smaller than said first and second predetermined values, respectively.

5. The motor control apparatus according to claim 1, wherein said generating means comprises:

a detector responsive to said steering angle for detecting a steering speed;

a first calculator responsive to said steering angle for calculating a recovery torque defined by a function for increasing said recovery torque as the increase of said steering angle;

a second calculator responsive to said steering speed for calculating a first limit value to restrict an over increase of said vehicle speed;

a third calculator responsive to a lapsed time from the beginning of the stopping state for calculating a second limit value to restrict rapid increase of said steering speed for an initial stage of said stopping state; and a comparator for comparing said recovery torque and said first and second limit values and for generating said recovery signal representing the lowest value among said recovery torque and said first and second limit values.

6. The motor control apparatus according to claim 5, wherein said second calculator has a function which decreases said first limit value with the increase of said steering speed.

7. The motor control apparatus according to claim 5, wherein said third calculator has a function which increases said second limit value to a set value for a set time.

8. The motor control apparatus according to claim 1, wherein said generating means comprises:

a detector responsive to said steering angle for detecting an actual steering speed;

a first calculator responsive to said steering angle for calculating a target steering speed which becomes larger with the increase of said steering angle;

a second calculator for calculating a deviation value between said target steering speed and said actual steering speed; and a third calculator responsive to said deviation value for calculating a recovery torque and for generating said recovery signal representing said recovery torque.

9. The motor control apparatus according to claim 8, wherein said third calculator has a function for increasing said recovery torque with the increase of said deviation value.

10. The motor control apparatus according to claim 1, wherein said generating means comprises:

a memory for storing said steering angle at the beginning of the stopping state as an initial steering angle;

a first calculator responsive to said initial steering angle and a lapsed time from the beginning of the stopping state for calculating a recovery target angle;

a second calculator responsive to said steering angle and said recovery target angle for calculating a deviation value; and a third calculator responsive to said deviation value for calculating a recovery torque and for generating said recovery signal representing said recovery torque.

11. The motor control apparatus according to claim 10, wherein said first calculator multiplies said initial steering angle by a coefficient defined by a decrease function with respect to said lapsed time.

12. The motor control apparatus according to claim 10, wherein said third calculator has a function for increasing said recovery torque with the increase of said deviation value.

* * * * *